United States Patent [19]

Standley

[11] 4,244,234
[45] Jan. 13, 1981

[54] POWER TRANSMISSION BELT STRUCTURE AND METHOD OF MAKING SAME

[75] Inventor: Paul M. Standley, Springfield, Mo.

[73] Assignee: Dayco Corporation, Dayton, Ohio

[21] Appl. No.: 949,610

[22] Filed: Oct. 10, 1978

[51] Int. Cl.³ .............................................. F16G 5/16
[52] U.S. Cl. ...................... 474/263; 156/139; 252/30; 474/264; 474/265
[58] Field of Search .................. 74/232, 233, 234; 156/137-142; 252/29, 30, 444

[56] References Cited

U.S. PATENT DOCUMENTS

| | | | |
|---|---|---|---|
| 1,970,509 | 8/1934 | DeWein et al. | 74/233 |
| 2,721,842 | 10/1955 | Tate | 252/30 |
| 2,968,617 | 1/1961 | Reykjalin | 252/30 |
| 3,242,154 | 3/1966 | O'Connor et al. | 252/444 X |
| 3,932,008 | 1/1976 | McCloskey et al. | 308/238 |
| 3,996,143 | 12/1976 | Orkin et al. | 308/238 X |
| 4,024,773 | 5/1977 | Hartman et al. | 74/233 |
| 4,031,768 | 6/1977 | Henderson et al. | 74/233 |

Primary Examiner—Lawrence J. Staab
Attorney, Agent, or Firm—Reuben Wolk; Charles E. Bricker

[57] ABSTRACT

An endless power transmission belt 10 having reduced coefficient of friction sides 16, 17 is provided which comprises a belt body 11 having a friction-reducing layer 15 bonded thereto. The layer 15 comprises a belt body 11 having a friction-reducing layer 15 bonded thereto. The layer 15 comprises an elastomer, activated carbon and at least one friction-reducing material.

13 Claims, 2 Drawing Figures

POWER TRANSMISSION BELT STRUCTURE AND METHOD OF MAKING SAME

This invention relates to V-belts.

For clutching applications, wherein a V-belt is brought into and out of clutching engagement with associated sheaves, most power transmission belts in present use are considered to be "too agressive". That is, the coefficient of friction of the driving surface or surfaces is too great and as the belt is brought into clutching engagement, it tends to lurch into movement.

One solution to this problem is provied in U.S. Pat. No. 4,024,773 which discloses a raw edge V-belt having a platform layer comprising an elastomer having graphite homogeneously dispersed therethrough. Another solution is set forth in U.S. Pat. No. 4,031,768 which discloses a raw edge V-belt comprising a tension section, a compression section and load-carrying means disposed between the sections wherein each section is made of a compound comprising a polymer, graphite and, optionally, stearic acid.

It is an object of this invention to provide a novel V-belt having non-parallel sides which have a reduced coefficient of friction.

It is another object of the present invention to provide a method for making a V-belt having non-parallel sides which have a reduced coefficient of friction.

Other objects, aspects and advantages of the invention will be apparent to those skilled in the art from a reading of the following specification, appended claims and attached drawings, in which:

In accordance with the present invention there is provided an endless, substantially trapezodial power transmission belt, known in the art as a V-belt, having reduced coefficient of friction non-parallel sides, which comprises a belt body having a compression section, a tension section and load-carrying means therebetween, the non-parallel sides having bonded thereto an exposed surface layer of an elastomeric composition comprising an elastomer, activated carbon and at least one friction reducing material.

The friction-reducing material is selected from the group consisting of nylon flock, a solid inorganic lubricant, and mixtures thereof. The solid lubricating components useful in the present invention are those selected from the group consisting of molybdenum disulfide, molybdenum diselenide, graphite, antimony trioxide, tungsten disulfide, tungsten diselenide, and mixtures thereof. The lubricating component can be any suitable lubricating grade or quality. When molybdenum disulfide is used, it should be free of flotation oil.

In a presently preferred embodiment, the friction-reducing material is formed of a mixture of nylon flock and at least one solid inorganic lubricant, preferably molybdenum disulfide.

The amount of friction-reducing material will generally range from about 3 to about 50 parts by weight per 100 parts by weight of the elastomer (phr).

Figure 1:
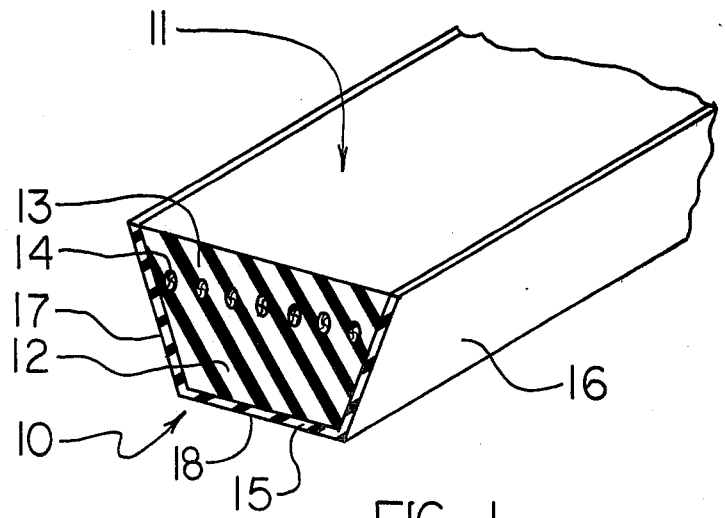
FIG. 1 is a perspective view illustrating one embodiment of this invention.

Reference is now made to FIG. 1 of the drawing which illustrates an exemplary embodiment of a V-belt of this invention which is designated generally by the reference number 10. The belt 10 comprises a belt body 11 having a compression section 12, a tension section 13 and a load-carrying means 14 therebetween. The belt 10 also has an outside ply or layer 15 of an elastomeric composition comprising activated carbon and at least one friction reducing material. The layer 15 is shown as covering the non-parallel sides 16 and 17 and the bottom surface 18 of the belt body 11. If desired, the layer 15 may be applied only to the non parallel sides 16 and 17, or it may be wrapped completely around the belt body 11.

The compounding recipe for the composition from which the layer 15 is made will generally be as follows:

|  | Parts by Weight | |
|---|---|---|
|  | Broad | Preferred |
| Elastomer | 100 | 100 |
| Carbon Black | 20–50 | 25 |
| Activated Carbon | 2–20 | 10 |
| Nylon Flock | 3–30 | 10 |
| Molybdenum Disulfide | 3–50 | 20 |
| Silica | 0–30 | — |
| Vulcanizing Agent | 0.5–2.0 | 0.75–1.75 |
| Other Additives | 1–20 | 5–10 |

The elastomer may be any rubber or rubber-like material known in the art for making power transmission belts. Examples of useful elastomers include polychloroprene, acrylonitrile-budadiene copolymers, polyisoprene, styrene-butadiene rubbers, polybutadiene, and the like, and blends thereof. It is presently preferred that the elastomer be a vulcanizable elastomer.

The carbon black can be any carbon black known in the art for reinforcing elastomeric compositions. Examples of useful carbon blacks include furnace process oil blacks such as SAF, HAF and GPF; furnace process gas blacks such as HMF and SRF; and the like.

The activated carbon is a rubber grade activated carbon.

The vulcanizing agent is generally sulfur or a sulfur-containing compound or mixture thereof. Other additives include accelerators, antioxidants, processing aids, bonding agents, and the like.

The above composition can be mixed conventionally in an internal mixer, e.g., a Banbury mixer, with all of the ingredients being added initially if so desired. They can also be mixed on an open mill in a conventional manner with the elastomer being first fluxed on the mill followed by the addition of the other ingredients in any desired order. The composition thus mixed is then ready for further processing, such as calendering into sheet form or calendering onto a suitable fabric.

Figure 2:
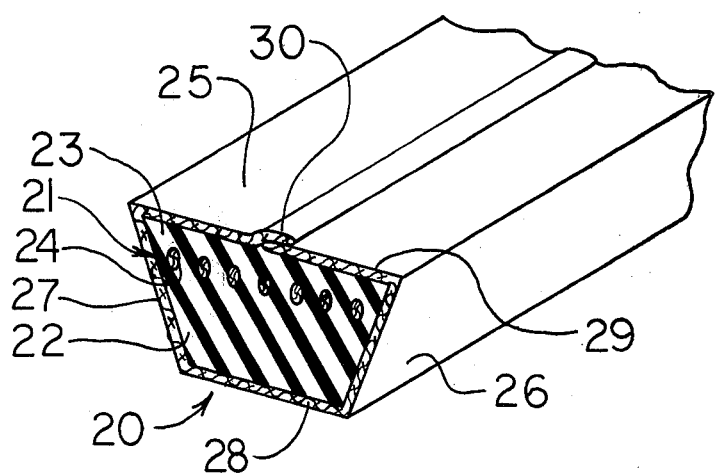
FIG. 2 is a perspective view illustrating another embodiment of this invention.

Another embodiment of this invention, as shown in FIG. 2 and designated by the numeral 20, comprises a belt body 21 having a compression section 22, a tension section 23 and a load-carrying section 24 therebetween. The belt 20 has a cover 25 which covers the entire peripheral outline of the belt, including the non-parallel sides 26 and 27, the bottom 28 and the top 29. A slight overlap 30 is provided in the cover 25. The overlap 30 is shown as being against the top 29, although it may alternatively be placed against the bottom 28.

The cover 25 is preferably made of a woven fabric, and such fabric may be any fabric known in the art. The cover 25 may a layer of the above-described elastomeric composition applied to both surfaces thereof, as by calendering.

The belt of this invention is made by first providing a belt body made primarily of any suitable elastomeric material. Any technique known in the art may be used to make the belt body.

The above-described elastomeric composition is calendered to provide a sheet-like stock having a thickness in the approximate range of 0.1 to 2 mm to make the elastomeric cover 15, or it is calendered onto a suitable fabric to make the fabric cover 25. The elastomeric cover 15 or the fabric cover 25 is then applied to the belt body, using any suitable apparatus or technique known in the art.

The belt construction defined after covering the belt body with the elastomeric cover 15 or the fabric cover 25 is then suitably cured using techniques and apparatus known in the art.

The driving surfaces of the cured belt have a relatively low coefficient of friction due to the presence of the nylon flock and/or the molybdenum disulfide in such surfaces. Additionally, the activated carbon present in the layer 15 or the fabric cove 25 will absorb the ingreddients of the belt body which migrate to the surface of the belt at operating temperatures and which tend to increase the coefficient of friction, such as waxes, organic fragments and plasticizers.

Various modifications of the invention will be apparent to those skilled in the art.

I claim:

1. An endless, substantially trapezoidal, power transmission belt having reduced coefficient of friction non-parallel sides comprising a belt body having a friction-reducing layer of an elastomeric composition bonded in association with said non-parallel sides, said composition comprising an elastomer, activated carbon and at least one friction-reducing material.

2. The belt of claim 1 wherein said friction-reducing material is selected from the group consisting of nylon flock, a solid inorganic lubricant, and mixtures thereof.

3. The belt of claim 1 wherein said solid inorganic lubricant is selected from the group consisting of molybdenum disulfide, molybdenum diselenide, graphite, antimony trioxide, tungsten disulfide, tungsten diselenide, and mixtures thereof.

4. The belt of claim 1 wherein the thickness of said friction-reducing layer has a thickness in the approximate range of 0.1 to 2 mm.

5. The belt of claim 1 wherein said friction-reducing layer is bonded to said non-parallel sides.

6. The belt of claim 1 wherein sid friction-reducing layer is bonded to a cover fabric which fabric is in turn bonded to said non-parallel sides.

7. The belt of claim 1 wherein said composition further comprises carbon black.

8. The belt of claim 1 wherein said elastomer is vulcanizable elastomer and said composition further comprises a vulcanizing agent.

9. A method for making an endless, substantially trapezoidal, power transmission belt having reduced coefficient of friction non-parallel sides which comprises the steps of providing an uncured belt body, applying a cover comprising a layer of an elastomeric composition comprising an elastomer, activated carbon and a friction-reducing material to said non-parallel sides, and curing the resulting assembly.

10. The method of claim 9 wherein said cover is made from a sheet of said elastomeric composition, said sheet having an approximate thickness in the range of 0.1 to 2 mm.

11. The method of claim 9 wherein said cover is made from a fabric having said elastomeric composition applied to both surfaces thereof.

12. The method of claim 9 wherein said friction-reducing material is selected from the group consisting of nylon flock, a solid inorganic lubricant and mixtures thereof.

13. The method of claim 12 wherein said solid inorganic lubricant is selected from the group consisting of molybdenum disulfide, molybdenum diselenide, graphite, antimony trioxide, tungsten disulfide, tungsten diselenide, and mixtures thereof.

* * * * *